US008745212B2

(12) United States Patent
Jain et al.

(10) Patent No.: US 8,745,212 B2
(45) Date of Patent: Jun. 3, 2014

(54) ACCESS TO NETWORK CONTENT (75) Inventors: Arvind Jain, Los Altos, CA (US);
Dominic Hamon, San Francisco, CA (US)

(73) Assignee: Google Inc., Mountain View, CA (US)

( * ) Notice: Subject to any disclaimer, the term of this patent is extended or adjusted under 35 U.S.C. 154(b) by 179 days.

(21) Appl. No.: 13/174,928

(22) Filed: Jul. 1, 2011

(65) Prior Publication Data
US 2013/0007260 A1    Jan. 3, 2013

(51) Int. Cl.
*G06F 15/173* (2006.01)

(52) U.S. Cl.
USPC ........... 709/224; 711/137; 711/158; 711/203; 718/100; 718/102

(58) Field of Classification Search
USPC .......................................................... 709/224
See application file for complete search history.

(56) References Cited

U.S. PATENT DOCUMENTS

| 5,715,445 | A |   | 2/1998  | Wolfe |
|-----------|---|---|---------|-------|
| 5,946,682 | A |   | 8/1999  | Wolfe |
| 6,055,569 | A | * | 4/2000  | O'Brien et al. ............... 709/223 |
| 6,100,871 | A |   | 8/2000  | Min |
| 6,151,603 | A |   | 11/2000 | Wolfe |
| 6,301,576 | B1 |  | 10/2001 | Wolfe |
| 6,604,103 | B1 |  | 8/2003  | Wolfe |
| 6,976,090 | B2 |  | 12/2005 | Ben-Shaul et al. |
| 7,047,502 | B2 |  | 5/2006  | Petropoulos et al. |
| 7,103,594 | B1 |  | 9/2006  | Wolfe |
| 7,277,924 | B1 |  | 10/2007 | Wichmann et al. |
| 7,428,701 | B1 |  | 9/2008  | Gavin et al. |
| 7,467,137 | B1 |  | 12/2008 | Wolfe |
| 7,480,669 | B2 |  | 1/2009  | Lo et al. |
| 7,487,147 | B2 |  | 2/2009  | Bates et al. |
| 7,536,635 | B2 |  | 5/2009  | Racovolis et al. |
| 7,613,712 | B2 |  | 11/2009 | Greenblatt et al. |
| 7,716,332 | B1 | * | 5/2010  | Topfl et al. .................... 709/226 |
| 7,747,749 | B1 |  | 6/2010  | Erikson et al. |
| 7,802,305 | B1 |  | 9/2010  | Leeds |
| 7,805,673 | B2 |  | 9/2010  | der Quaeler et al. |
| 7,840,589 | B1 |  | 11/2010 | Holt et al. |

(Continued)

FOREIGN PATENT DOCUMENTS

JP    2004536389 A    12/2004
KR    20070101237 A    10/2007

(Continued)

OTHER PUBLICATIONS

International Search Report and Written Opinion dated Dec. 14, 2012 for PCT application US2012044896.

(Continued)

*Primary Examiner* — Hamza Algibhah
*Assistant Examiner* — Natisha Cox
(74) *Attorney, Agent, or Firm* — Lerner, David, Littenberg, Krumholz & Mentlik, LLP (57) ABSTRACT A method and system for improving access to network content are described. Aspects of the disclosure minimize the delay between a navigation event and a network response by prerendering the next navigation event. For example, the method and system may predict a likely next uniform resource locator during web browsing to preemptively request content from the network before the user selects the corresponding link on a web page. The methods and systems describe a variety of manners for prerendering content and managing and configuring prerendering operations.

19 Claims, 8 Drawing Sheets

(56) References Cited

U.S. PATENT DOCUMENTS

| | | |
|---|---|---|
| 7,876,335 B1 | 1/2011 | Pittenger et al. |
| 7,908,336 B2 | 3/2011 | Carlson et al. |
| 8,112,308 B1 | 2/2012 | Ho et al. |
| 8,260,938 B2 | 9/2012 | Gupta et al. |
| 2002/0075333 A1 | 6/2002 | Dutta et al. |
| 2003/0050906 A1 | 3/2003 | Clifton-Bligh |
| 2003/0061451 A1 | 3/2003 | Beyda |
| 2003/0088580 A1* | 5/2003 | Desai et al. ............. 707/104.1 |
| 2003/0212760 A1 | 11/2003 | Chen et al. |
| 2004/0267600 A1 | 12/2004 | Horvitz |
| 2004/0268228 A1 | 12/2004 | Croney et al. |
| 2005/0132296 A1 | 6/2005 | Milic-Frayling et al. |
| 2005/0240576 A1 | 10/2005 | Piscitello et al. |
| 2006/0047804 A1* | 3/2006 | Fredricksen et al. ......... 709/224 |
| 2006/0143568 A1 | 6/2006 | Milener et al. |
| 2006/0282771 A1 | 12/2006 | Vinci |
| 2007/0005425 A1 | 1/2007 | Bennett et al. |
| 2007/0198634 A1* | 8/2007 | Knowles et al. ............. 709/203 |
| 2007/0208704 A1 | 9/2007 | Ives |
| 2007/0220010 A1 | 9/2007 | Ertugrul |
| 2007/0288648 A1 | 12/2007 | Mehanna et al. |
| 2008/0052219 A1 | 2/2008 | Sandholm et al. |
| 2008/0104407 A1 | 5/2008 | Horne et al. |
| 2008/0140941 A1* | 6/2008 | Dasgupta et al. ............. 711/137 |
| 2008/0201332 A1 | 8/2008 | Souders et al. |
| 2008/0208789 A1 | 8/2008 | Almog |
| 2008/0249969 A1* | 10/2008 | Tsui et al. .................... 706/46 |
| 2008/0256134 A1 | 10/2008 | Bogner et al. |
| 2008/0295006 A1 | 11/2008 | LuVogt et al. |
| 2009/0013006 A1 | 1/2009 | Friedl et al. |
| 2009/0070392 A1 | 3/2009 | Le Roy et al. |
| 2009/0094196 A1 | 4/2009 | Piwowarski et al. |
| 2009/0132949 A1 | 5/2009 | Bosarge |
| 2009/0158221 A1 | 6/2009 | Nielsen et al. |
| 2009/0171930 A1 | 7/2009 | Vaughan et al. |
| 2009/0216639 A1 | 8/2009 | Kapczynski et al. |
| 2009/0265774 A1 | 10/2009 | Malik et al. |
| 2009/0327424 A1 | 12/2009 | Bernstein et al. |
| 2010/0005061 A1 | 1/2010 | Basco et al. |
| 2010/0023581 A1 | 1/2010 | Lahav |
| 2010/0031366 A1 | 2/2010 | Knight et al. |
| 2010/0107115 A1 | 4/2010 | Sareen et al. |
| 2010/0131902 A1 | 5/2010 | Teran et al. |
| 2010/0191856 A1 | 7/2010 | Gupta |
| 2010/0251116 A1 | 9/2010 | Rimas-Ribikauskas et al. |
| 2010/0306665 A1 | 12/2010 | Milic-Frayling et al. |
| 2011/0029518 A1 | 2/2011 | Tong |
| 2011/0029670 A1 | 2/2011 | Klein |
| 2011/0119361 A1 | 5/2011 | Issa et al. |
| 2011/0173569 A1 | 7/2011 | Howes et al. |
| 2011/0199304 A1 | 8/2011 | Walley et al. |
| 2011/0225494 A1 | 9/2011 | Shmuylovich et al. |
| 2011/0289317 A1 | 11/2011 | Darapu et al. |
| 2012/0017146 A1 | 1/2012 | Travieso et al. |
| 2012/0084644 A1 | 4/2012 | Robert et al. |
| 2012/0254721 A1 | 10/2012 | Jain et al. |
| 2012/0254727 A1 | 10/2012 | Jain et al. |
| 2012/0324043 A1 | 12/2012 | Burkard et al. |

FOREIGN PATENT DOCUMENTS

| | | |
|---|---|---|
| KR | 20080111822 | 12/2008 |
| KR | 20100102858 A | 9/2010 |
| KR | 20100112512 | 10/2010 |

OTHER PUBLICATIONS

Christopher Schmitt, "CSS Cookbook, Third Edition," O'Reilly Media, Dec. 24, 2009, pp. 1, 33, 35 and 217-219.

Venoila et al. "T-Cube: A Fast, Self-Disclosing Pen-Based Alphabet". Copyright Date 1994.

Guimbretiere et al. "FlowMenu: Combining Command, Text, and Data Entry". Copyright 2000.

U.S. Appl. No. 13/353,626, filed Jan. 19, 2012.

International Search Report dated Nov. 28, 2012, in International Application No. PCT/US2012/036519.

International Search Report and Written Opinion for Application No. PCT/US2012/042186 dated Feb. 20, 2013.

U.S. Appl. No. 13/100,615, filed May 4, 2011.

U.S. Appl. No. 13/175,115, filed Jul. 1, 2011.

U.S. Appl. No. 13/174,925, filed Jul. 1, 2011.

U.S. Appl. No. 13/174,928, filed Jul. 1, 2011.

https://developer.mozilla.org/en/Link__prefetching__FAQ (2003).

StackOverflow.com, "Detect if Browser Tab Has Focus," Sep. 2011, 2 pages.

International Search Report & Written Opinion dated May 7, 2013 for Application No. PCT/US2013/021927.

International Search Report and Written Opinion for Application No. PCT/US2012/055473 dated Feb. 26, 2013.

* cited by examiner

ACCESS TO NETWORK CONTENT

BACKGROUND

The advent of the World Wide Web has placed more information at the fingertips of today's users than ever before. Various websites cater to nearly every need and interest, providing access to reference information, business and financial documents, social networking, and more. Widespread broadband Internet access provides faster access to these sites than ever before.

However, as fast as current high-speed Internet services are, the act of browsing the web is not instantaneous. When a user selects a link on a page or enters a uniform resource locator (URL) in a text field, there is a delay while data is requested from the host, sent to the client, and rendered in the browser. The user is typically idle while waiting for their requested site to load. While high-speed Internet access may limit this delay to a few seconds, even this short delay can add up to thousands of man-hours of lost productivity each year.

BRIEF SUMMARY

A method and system for improving access to network content are described. Aspects of this disclosure minimize the delay in accessing web content by identifying (e.g. predicting) a user navigation event on a web page. Aspects of the disclosure then request content associated with the next navigation event and prerender the content in a hidden application instance. When the user actually selects the navigation event, the hidden application instance is displayed to the user, minimizing the delay the user experiences.

Aspects of the disclosure describe a computer-implemented method for accessing network content. The method may comprise determining a probability value, using a processor, for each of one or more links associated with web content, the probability value indicating a likelihood that a user will select the associated link, determining whether the probability value exceeds one or more action thresholds, each action threshold being associated with a network content access action, and performing the network content access action associated with a highest action threshold that the probability value exceeds, to reduce a delay in accessing network content upon selection of the associated link. In some aspects, the method further includes determining the probability value by at least one of analyzing a navigation history, analyzing a text entry, and analyzing a mouse cursor movement. The network content access action may include at least one of displaying the network content in a primary browser window, prerendering the network content in a hidden browser instance, prefetching a top-level resource, initiating a transmission control protocol connection, and retrieving domain name services information. The method may include repeating determining the probability value, determining whether the probability value exceeds the one or more action thresholds, and performing the network content access action for each of a plurality of links present on a web page. In some aspects, the method includes ordering the one or more action thresholds in increasing order of required probability value, such that network content access actions requiring a higher threshold probability value are performed after network content access actions requiring a lower threshold probability value. The probability value may be received from a web service.

Some aspects of the disclosure provide for a non-transitory computer readable storage medium containing instructions that, when executed by a processor cause the processor to perform a method. This method may include determining a probability value, using a processor, for each of one or more links associated with web content, the probability value indicating a likelihood that a user will select the associated link, determining whether the probability value exceeds one or more action thresholds, each action threshold being associated with a network content access action, and performing the network content access action associated with a highest action threshold that the probability value exceeds, to reduce a delay in accessing network content upon selection of the associated link. The storage medium may further include instructions that include determining the probability value by at least one of analyzing a navigation history, analyzing a text entry, and analyzing a mouse cursor movement. The network content access action may include at least one of displaying the network content in a primary browser window, prerendering the network content in a hidden browser instance, prefetching a top-level resource, initiating a transmission control protocol connection, and retrieving domain name services information. In some aspects, the instructions include repeating determining a probability value, determining whether the probability value exceeds the one or more action thresholds, and performing the network content access action for each of a plurality of links present on a web page. The instructions may include ordering the one or more action thresholds in increasing order of required probability value, such that network content access actions requiring a higher threshold probability value are performed after network content access actions requiring a lower threshold probability value. In some aspects, the probability value is received from a web service.

Other aspects of the disclosure provides for a processing system for accessing network content. The processing system may include at least one processor, and a memory, coupled to the processor, for storing one or more probability values. The processor may be configured to determine a probability value for each of one or more links associated with web content, the probability value indicating a likelihood that a user will select the associated link, determine whether the probability value exceeds one or more action thresholds, each action threshold being associated with a network content access action, and perform the network content access action associated with a highest action threshold that the probability value exceeds, to reduce a delay in accessing network content upon selection of the associated link. The processor may be further configured to determine the probability value by at least one of analyzing a navigation history, analyzing a text entry, and analyzing a mouse cursor movement. The network content access action may include at least one of displaying the network content in a primary browser window, prerendering the network content in a hidden browser instance, prefetching a top-level resource, initiating a transmission control protocol connection, and retrieving domain name services information. The processor may be further configured to repeat determining a probability value, determining whether the probability value exceeds the one or more action thresholds, and performing the network content access action for each of a plurality of links present on a web page. In some aspects, the processor may be further configured to order the one or more action thresholds in increasing order of required probability value, such that network content access actions requiring a higher threshold probability value are performed after network content access actions requiring a lower threshold probability value. The probability value may be received from a web service.

DETAILED DESCRIPTION

Embodiments of a system and method for improving access to network content are described herein. Aspects of the disclosure minimize the delay between a user's selection of a navigation event and display of the content associated with the navigation event by prerendering content associated with the navigation event prior to the user's selection of the event. For example, the method and system may predict a likely next uniform resource locator during web browsing to preemptively request content from the network before the user selects the corresponding link, thus minimizing the wait time when a user selects a hyperlink on a web page. Various methods for performing the prerendering operation, configuring the prerendering operation, and managing the prerendering operation are described. For the purposes of this application, the term "prerendering" generally refers to the act of requesting all resources (e.g., any executable code, scripting language, files, and/or interactive objects) necessary to load the content of a web address, and loading the content in a web browser instance.

Figure 1:
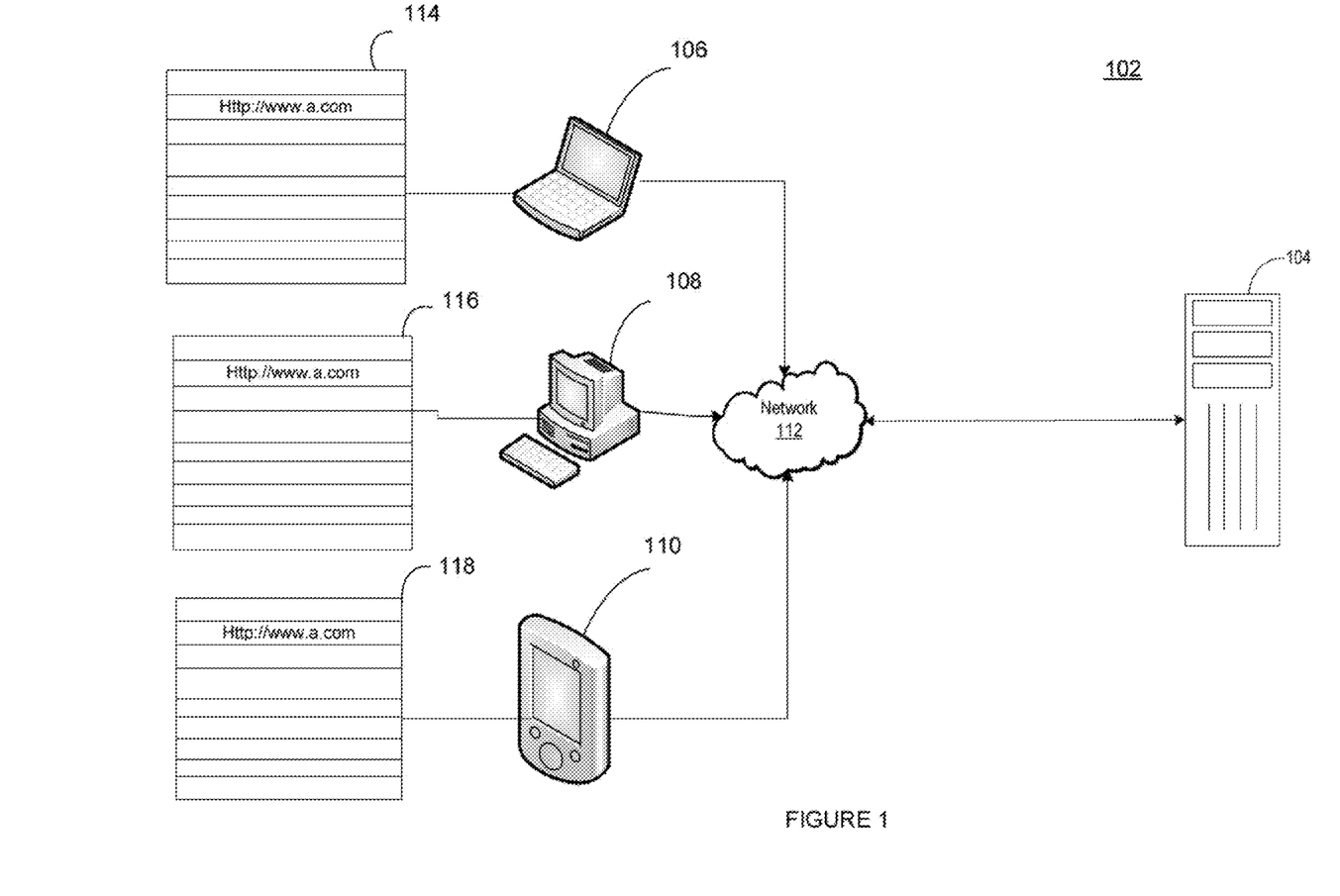
FIG. 1 is a system diagram depicting an example of a server in communication with example client devices in accordance with aspects of the disclosure.

As shown in FIG. 1, an example system 102 in accordance with one aspect includes a server 104 in communication with one or more client devices 106, 108, 110 displaying web browser interfaces 114, 116, 118. The user of the client device 106 may browse to a web page located at "www.a.com" as displayed on the web browser interface 114. That page includes content selectable by the user.

The client devices may be any device capable of managing data requests via a network 112. Examples of such client devices include a personal computer (PC) 108, a mobile device 110, or a server 106. The client devices 106, 108, 110 are operable to perform prerendering operations during the execution of a web browser application. The server 104 may transmit navigation history data to the client devices 106, 108, 110, to enable prediction of a next navigation event. In some aspects, the client devices 106, 108, 110 determine a next navigation event using a local navigation history and generate a web request to the server 104 to prerender the content associated with the next navigation event. The prerender operation may also be determined dynamically by, for example, a JAVASCRIPT code. For example, a prerendering operation may occur when the user places a cursor over a link. For example, the user of the client device 106 may browse to a web page located at "www.a.com" as displayed on the web browser interface 114. That page includes content selectable by the user. Based on the user's navigation history, the client device 106 may determine which of the selectable content the user is likely to select, and then prerender the content associated with the selectable content by requesting the content from the server 104.

As another example, the client device 108 may display www.a.com within a browser interface 116. The client device 108 may receive an aggregate set of navigation statistics from the server 104, and then determine which selectable content the user is likely to select based upon the aggregate set of navigation statistics. As yet another example, the client device 110 may display www.a.com within a browser interface 118. The client device 108 may determine which selectable content the user is likely to select based upon a cursor position within the browser interface 116.

While the concepts described herein are generally described with respect to a web browser interface 114, 116, 118 executing on a client device 106, 108, 110, aspects of the disclosure can also be applied to any computing node capable of managing navigation events over a network, including a server 104.

The client devices 106, 108, 110 may also comprise personal computers, personal digital assistants ("PDA"): tablet PCs, netbooks, laptops, mobile phones, etc. Indeed, client devices in accordance with the systems and methods described herein may comprise any device operative to process instructions and transmit data to and from humans and other computers including general purpose computers, network computers lacking local storage capability, etc.

The client devices 106, 108, 110 may be operable to predict navigation events to assist in data access on the network 112. For example, the client devices may predict a likely navigation event to facilitate prerendering of a web page in order to improve the user's browsing experience. In some aspects, the server 104 provides navigation data which may be used by the client devices 106, 108, 110 to predict a likely navigation event. In some aspects, the client devices 106, 108, 110 predict a likely navigation event using local data. In some aspects, a likely navigation event is indicated as a hypertext markup language (HTML) tag embedded within a web page.

The network 112, and the intervening nodes between the server 104 and the client devices 106, 108, 110, may comprise various configurations and use various protocols including the Internet, World Wide Web, intranets, virtual private networks, local Ethernet networks, private networks using communication protocols proprietary to one or more companies, cellular and wireless networks (e.g., Wi-Fi), instant messaging, hypertext transfer protocol ("HTTP") and simple mail transfer protocol ("SMTP"), and various combinations of the foregoing. It should be appreciated that a typical system may include a large number of connected computers.

Although certain advantages are obtained when information is transmitted or received as noted above, other aspects of the system and method are not limited to any particular manner of transmission of information. For example, in some aspects, information may be sent via a medium such as an optical disk or portable drive. In other aspects, the information may be transmitted in a non-electronic format and manually entered into the system.

Although some functions are indicated as taking place on the server 104 and other functions are indicated as taking place on the client devices 106, 108, 110, various aspects of the system and method may be implemented by a single computer having a single processor. It should be appreciated that aspects of the system and method described with respect to the client may be implemented on the server, and vice-versa.

Figure 2:
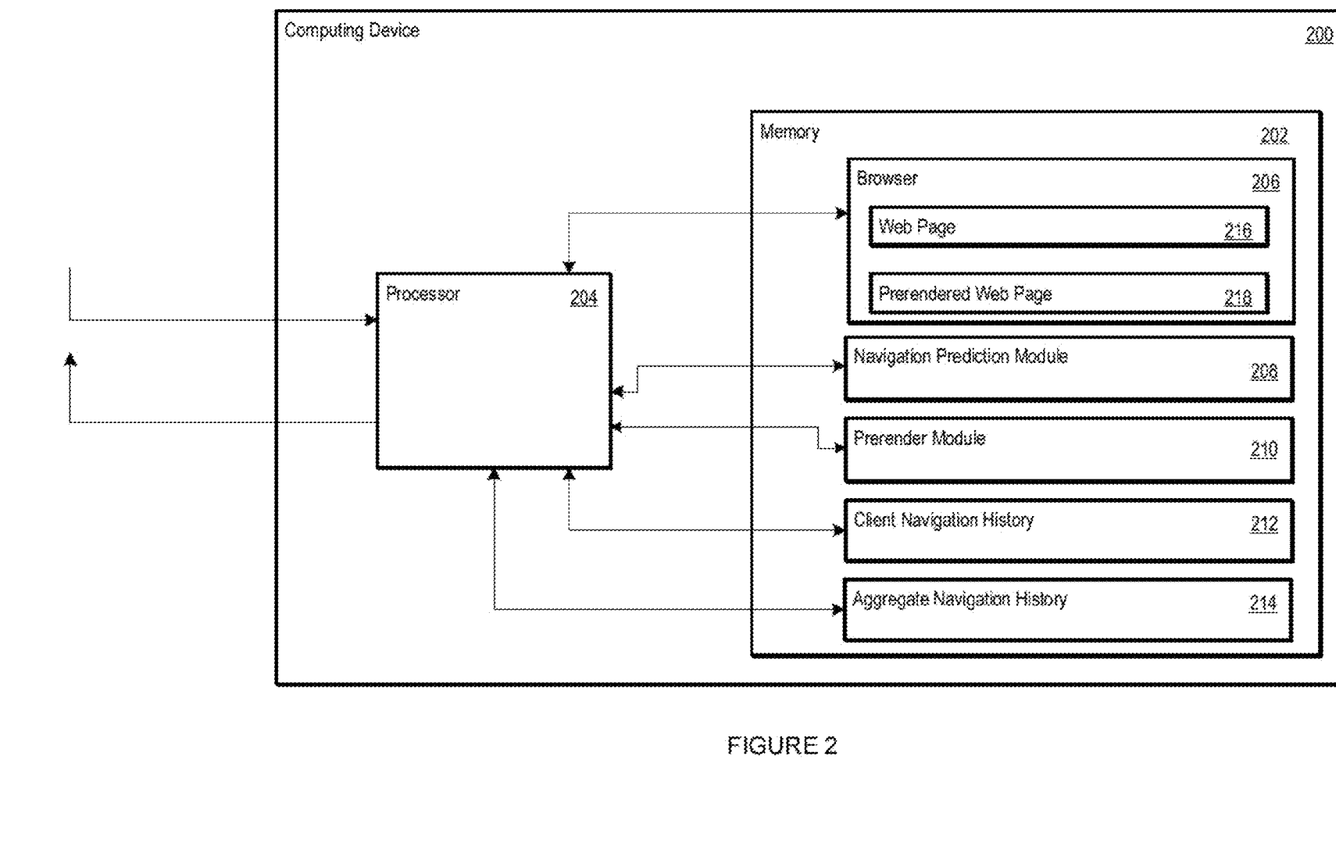
FIG. 2 is block diagram depicting an example of a computing device in accordance with aspects of the disclosure.

FIG. 2 is a block diagram depicting an example of a computing device 200, such as one of the client devices 106, 108, 110 described with respect to FIG. 1. The computing device 200 may include a processor 204, a memory 202 and other components typically present in general purpose computers. The memory 202 may store instructions and data that are accessible by the processor 204. The processor 204 may execute the instructions and access the data to control the operations of the computing device 200.

The memory 202 may be any type of tangible memory operative to store information accessible by the processor 204, including a computer-readable medium, or other medium that stores data that may be read with the aid of an electronic device, such as a hard-drive, memory card, read-only memory ("ROM"), random access memory ("RAM"), digital versatile disc ("DVD") or other optical disks, as well as other write-capable and read-only memories. The system and method may include different combinations of the foregoing, whereby different portions of the instructions and data are stored on different types of media.

The instructions may be any set of instructions to be executed directly (such as machine code) or indirectly (such as scripts) by the processor 204. For example, the instructions may be stored as computer code on a computer-readable medium. In that regard, the terms "instructions" and "programs" may be used interchangeably herein. The instructions may be stored in object code format for direct processing by the processor 204, or in any other computer language including scripts or collections of independent source code modules that are interpreted on demand or compiled in advance. Functions, methods and routines of the instructions are explained in more detail below (see FIGS. 3-8).

Data may be retrieved, stored or modified by processor in accordance with the instructions. For instance, although the architecture is not limited by any particular data structure, the data may be stored in computer registers, in a relational database as a table having a plurality of different fields and records, Extensible Markup Language ("XML") documents or flat files. The data may also be formatted in any computer readable format such as, but not limited to, binary values or Unicode. By further way of example only, image data may be stored as bitmaps comprised of grids of pixels that are stored in accordance with formats that are compressed or uncompressed, lossless (e.g., BMP) or lossy (e.g., JPEG), and bitmap or vector-based (e.g., SVG), as well as computer instructions for drawing graphics. The data may comprise any information sufficient to identify the relevant information, such as numbers, descriptive text, proprietary codes, references to data stored in other areas of the same memory or different memories (including other network locations) or information that is used by a function to calculate the relevant data.

The processor 204 may be any suitable processor, such as various commercially available general purpose processors. Alternatively, the processor 204 may be a dedicated controller such as an application-specific integrated circuit ("ASIC").

Although FIG. 2 functionally illustrates the processor and memory as being within a single block, it should be understood that the processor 204 and memory 202 may actually comprise multiple processors and memories that may or may not be stored within the same physical housing. Accordingly, references to a processor, computer or memory will be understood to include references to a collection of processors, computers or memories that may or may not operate in parallel.

The computing device 200 may be at one node of a network and be operative to directly and indirectly communicates with other nodes of the network. For example, the computing device 200 may comprise a web server that is operative to communicate with client devices via the network such that the computing device 200 uses the network to transmit and display information to a user on a display of the client device.

The system can provide privacy protections for the client data including, for example, anonymization of personally identifiable information, aggregation of data, filtering of sensitive information, encryption, hashing or filtering of sensitive information to remove personal attributes, time limitations on storage of information, and/or limitations on data use or sharing. Data can be anonymized and aggregated such that individual client data is not revealed. A user may also be provided with an opportunity to opt in/out to enable the collection of sharing of data.

In order to facilitate the prerendering operations of the computing device 200, the memory 202 may further comprise a browser 206, a navigation prediction module 208, a prerender module 210, a client navigation history 212, and an aggregate navigation history 214. Although a number of discrete modules (e.g., 206, 208, 210, 212 and 214) are identified in connection with FIG. 2, the functionality of these modules may overlap and/or exist in a fewer or greater number of modules than what is shown, with such modules residing at one or more processing devices, which may be geographically dispersed.

The browser 206 provides for the display of a web page 216 to a user of the client device by sending and receiving data across a computer network. The web page 216 may be received in response to a network request, such as a Hypertext Transfer Protocol (HTTP) GET request. The web page 216 may be provided in a markup language, such as Hypertext Markup Language (HTML). The web page 216 may also include various scripts, data, forms, and the like, including interactive and executable content such as ADOBE FLASH content, JAVASCRIPT content, and the like.

The browser 206 may further comprise a prerendered web page 218. The prerendered web page 218 represents a web page that was requested and accessed by the prerender module 210 in response to a predicted navigation event provided by the navigation prediction module 208. The prerendered web page 218 may be stored in a hidden rendering environment such that the prerendered web page 218 is not visible to a user until the user selects a navigation link with which the prerendered web page 218 is associated. The hidden rendering environment refers to any representation that does not have an immediately apparent interface for the user. For example, the prerendered web page 218 may be stored within a browser "tab" that does not have an associated selection control in a web browser tab interface. The hidden rendering environment may be accessible via a menu or interface command, and in response to the selection of this interface command an interface for the prerendered content is generated, such as by adding a selection control for the prerendered content to the browser tab interface. The hidden rendering environment may also be provided by a variety of other methods suitable to receive and render the page environment while avoiding distraction of the user with potentially irrelevant content. The prerendered web page 208 may be stored in a completely executed and rendered format. For example, any executable code, scripting language, multimedia files, and/or interactive objects may be fully requested and loaded in the prerendering environment. In the event the user selects the navigation event associated with the prerendered web page 218, the browser 206 may swap the prerendered web page 218 with the web page 216, thus providing the content associated with the navigation event without the need to send another network request.

The memory 202 may further comprise a prerender module 210 to perform fetching of a next web page as identified by the navigation prediction module 208. The prerender module 210 sends a network request for the web page identified to be the likely next navigation destination that the user will select. The web page received in response to this request is then stored in the browser 206 as the prerendered web page 218. In some aspects, the web page request generated by the prerender module 210 is identical to a standard web page request. In some aspects, the web page request generated by the prerender module 210 comprises certain features to facilitate the prerender process as described further below (see FIGS. 3-8).

In some aspects, the computing device 200 may determine a likely navigation event using a client navigation history, such as the client navigation history 212. The client navigation history 212 comprises a set of navigation events associated with past activity of the browser 206. The client navigation history 212 may track a set of visited URLs, also known as a "clickstream," which tracks an order in which the user typically visits URLs (e.g., when the user visits a news website, they tend to next select a URL corresponding to the top story of the day), a set of access times associated with the URLs, and the like. The aggregate navigation history 214 may comprise similar data, but keyed to multiple users rather than a single user. The client navigation history 212 and aggregate navigation history 214 may represent data collected using one or more browser add-ons, scripts, or toolbars. In some aspects, the client navigation history 212 and/or aggregate navigation history 214 are maintained on a remote server, such as the server 104, and provided to the computing device 200. The computing device 200 may maintain separate records to facilitate the predicting of a next likely navigation event, or it may act in concert with remotely stored data. In some aspects, only aggregate navigation history 214 pertaining to the particular web page the user is currently viewing is provided to the computing device 200.

As described above, the aggregate navigation history data 214 can be maintained in an anonymous fashion, with privacy protections for the individual client data that comprises the aggregate navigation history, including, for example, anonymization of personally identifiable information, aggregation of data, filtering of sensitive information, encryption, hashing or filtering of sensitive information to remove personal attributes, time limitations on storage of information, and/or limitations on data use or sharing. The aggregate navigation history 214 data can be anonymized and aggregated such that individual client data is not revealed.

Figure 3:
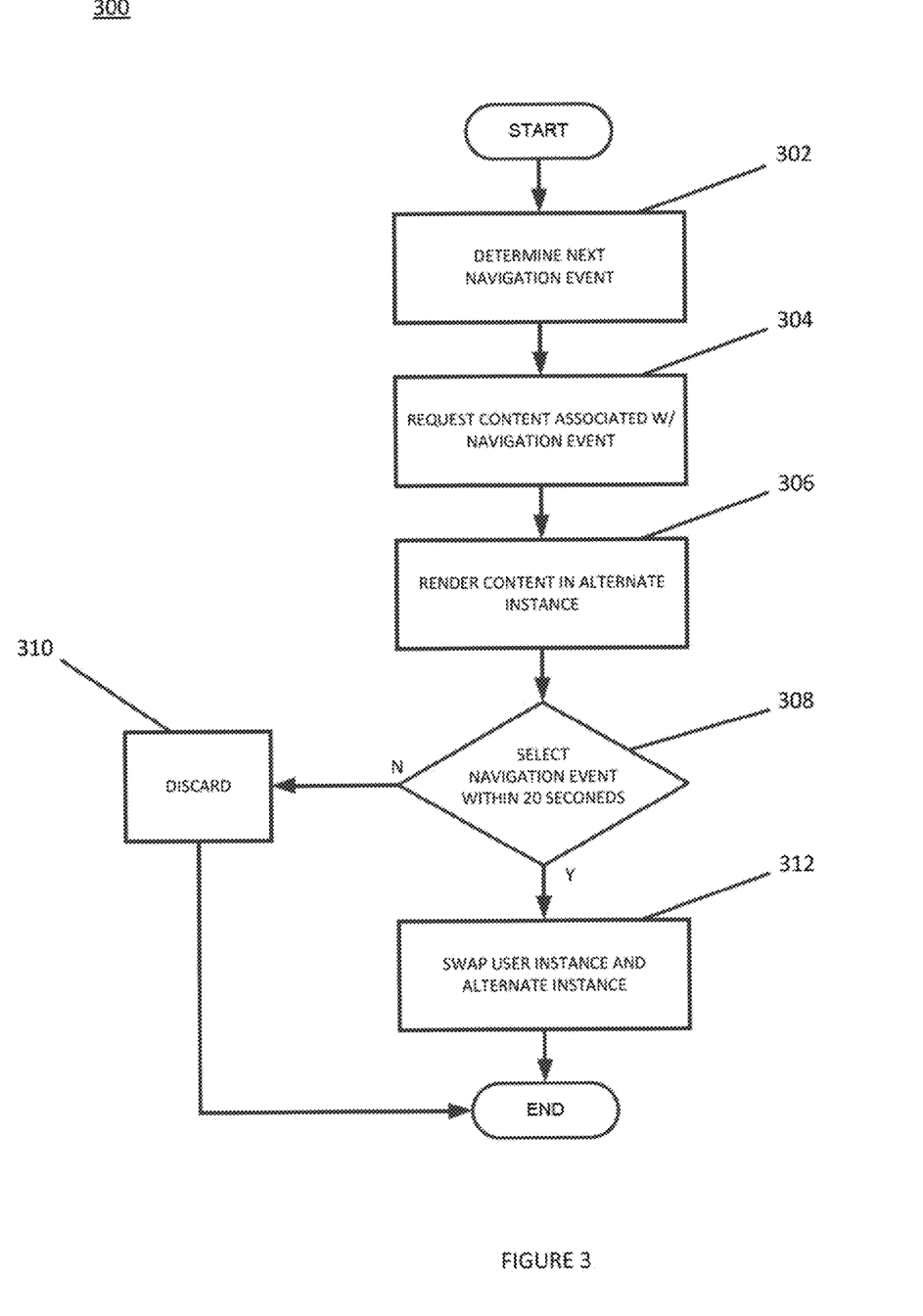
FIG. 3 is a flow diagram depicting an example method for prerendering a web page in accordance with aspects of the disclosure.

FIG. 3 is a flow diagram depicting an example method 300 for prerendering a web page in accordance with aspects of the disclosure. Aspects of the method 300 operate to minimize load times for network content by requesting the network content prior to the user navigating to said network content. The method 300 may be performed by a computing device, such as the computing device 200, to eliminate delays in the user web browsing experience by prerendering web pages that are identified as likely navigation targets by the user. For example, the method 300 may be performed by elements of the browser 206, the navigation prediction module 208, and the prerender module 210 acting together. While aspects of the method 300 are described with respect to the computing device 200, the method 300 may also be performed by the server 104, or any device with hardware and/or software designed to accept instructions. Example aspects of the method 300 as described relate to prerendering of a single page associated with a single navigation event, but the method 300 is also broadly applicable to prerendering multiple pages associated with one or more navigation events, such as prerendering multiple pages in sequence or in a plurality of parallel prerendering instances.

At stage 302, the computing device 200 determines a next navigation event within a web browser. The next navigation event may be received from a navigation prediction element, such as the navigation prediction module 208, or the next navigation event may be embedded within the web page displaying within the web browser. For example, a search engine may embed a tag within a set of search results to indicate that a particular link associated with the most relevant result should be prerendered by the web browser. A method for embedding prerendering tags within a web page is described below (see FIG. 4).

At stage 304, the computing device 200 requests the content associated with the navigation event identified at stage 302. The request may comprise a hypertext transfer protocol (HTTP) GET request, a file transfer protocol (FTP) request, or any other network data access request as known in the art. A first set of web content may be provided in response to a HTTP GET request, which may then lead to additional HTTP GET requests in accordance with the first set of web content. For example, a HTTP GET request may result in a base web page being sent to the web browser, which may trigger other page loading operations, such as additional GET requests. The base web page may have multiple embedded images, which are then fetched and rendered using HTTP GET requests for each image. The prerendering process as described may request the full web page, including associated scripts, and then execute those scripts. In response to the request, the web content associated with the navigation event is sent to the web browser. For example, the remote server 104 may send the content to the web browser. To return to the search engine example, upon receiving a web page with an embedded prerender tag, the computing device 200 requests and renders the web page associated with the URL associated with the top search result as identified by the search engine.

At stage 306, the computing device 200 renders content associated with the navigation event determined at stage 302. The content may be rendered in an alternate instance of the web browser that is hidden from the user. For example, the content may be rendered by an alternate process or in a hidden web browser tab. In some aspects, the computing device 200 may render content associated with multiple navigation events. For example, the navigation events may be associated with a priority value, with higher or lower values associated with more likely navigation events. As such, the computing device 200 may render the top "n" most likely events, depending upon the capabilities of the computing device 200 (see FIG. 7).

In some aspects, the rendered content may include a redirection operation. An example of a redirection operation is when the act of loading a first page, for instance, www.a.com, causes the browser to load a second page, such as www.b.com. Redirection may occur in response to a HTML tag, a JAVASCRIPT navigation command, or the like. In the case a prerendered page requests a redirection operation, said redirection operation would also occur in the alternate instance.

In some aspects, a first redirection operation may lead to subsequent redirections. For example, www.a.com may lead to www.b.com, which leads to www.c.com. Aspects of the system and method may account for this fact, such as by storing a history of redirection operations and prerendering the last page in a series in response to a first page being identified to prerender. In some aspects, the method 300 may short-circuit redirection operations by not prerendering intermediate pages when the destination result page (i.e. the page at the end of the redirection operations) is known, and only prerendering the final page in the series.

At stage 308, the computing device 200 may determine whether the user has selected the link identified at stage 302 within a particular time period. For example, the method 300 may wait for 10 seconds, 20 seconds, 30 seconds, one minute, 5 minutes, or any other time frame. In some aspects, the time frame may be configurable within an options menu associated with the web browser. The time frame may also be specified by the server 104. For example, the server 104 may embed a timeout value within a prerender tag, indicating the length of time the content associated with the tag should be held before being discarded. If the user has selected the link within the time period, the method 300 proceeds to stage 312. Otherwise, the method 300 proceeds to stage 310.

At stage 310, the computing device 200 discards the prerendered content. The prerendered content is allowed to expire in this manner in order to free up system resources associated with the prerender operation and prevent the user from being presented with stale data. In some aspects, a different expiration period may be specified for different types of data. For example, data that is likely to rapidly change, such as breaking news articles, stock quotes, syndication feeds, and the like, is more likely to grow stale quickly, and might be associated with a shorter expiration timer, such as 10 seconds, 20 seconds, or one minute. Data that is less likely to change, such as reference articles, archives, box scores, and the like, might be associated with a longer expiration timer, such as an hour, 6 hours, 24 hours, a week, or the like. In some aspects, the wait time is based on a page type. For example, if the user is viewing a lengthy news article, a longer wait time may be specified when prerendering a next page of the article to provide the user time to read the current page of the article before selecting the next page. In some aspects, the wait time is determined by a time-to-live (TTL) parameter embedded within the page. In some aspects, the wait time is hard coded within the browser. The method 300 then ends after the prerendered content is discarded, though in some aspects the method 300 may repeat indefinitely as the user browses web content.

At stage 312, the computing device 200 swaps the alternate instance containing the prerendered content into the current user instance, in response to the user selecting the navigation event determined at stage 302. In this manner, the computing device 200 displays the content associated with the navigation event instantly, without a delay while the data is requested from and received from the host server. To return to the search results example, if the user selects the most relevant result, the associated page is already loaded in the alternate instance and thus is available instantly as soon as the user clicks the link. In some aspects, the user may select the navigation event prior to the prerendering operation completing. In such cases, the partially loaded page would be swapped into the current user instance. The partially loaded page would then continue to load in the current user instance as normal. The method 300 then ends after making the prerendered content available to the user.

Figure 4:
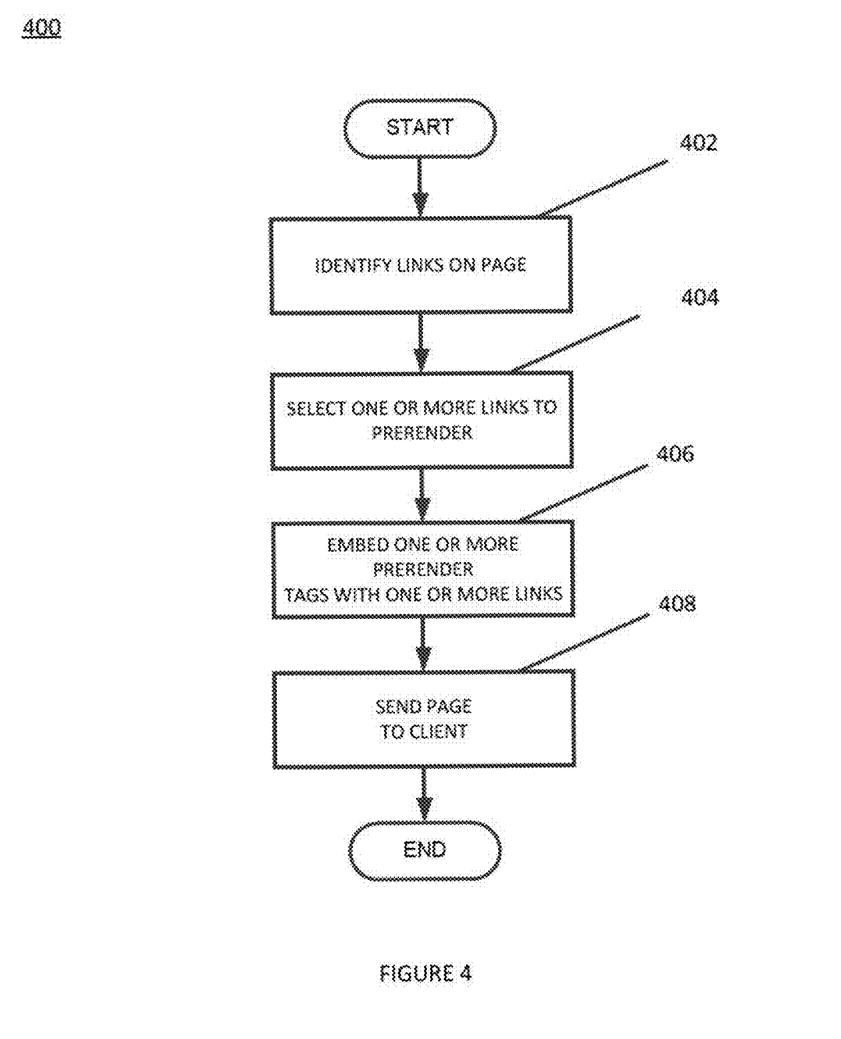
FIG. 4 is a flow diagram depicting an example method for indicating a navigation event to prerender in accordance with aspects of the disclosure.

FIG. 4 is a flow diagram depicting an example method 400 for indicating a navigation event to prerender. In some aspects, the server hosting the content, such as the server 104, can specify the navigation event for the web browser to prerender. Allowing the server to specify the prerendered link or links may be optimal for a variety of reasons, such as because the server has the best information on which navigation event is most likely, or because the server wishes to manage bandwidth associated with particular hosted links, such as for load balancing operations. As such, the server 104 may embed a prerender tag or tags within a hosted page, instructing the prerender module 210 of the computing device 200 in which content to render.

At stage 402, the server 104 identifies one or more links within a hosted web page. For example, the server 104 may generate a list of web sites in response to a query from the computing device 200. Each search result may be associated with a particular link on the page that is to be provided in response to the query.

At stage 404, the server 104 selects one or more links to prerender, chosen from the links identified at stage 402. The links to prerender may be chosen by a variety of methods for a variety of purposes, such as by examining a user navigation history, an aggregate navigation history, a most relevant link, and the like. In some aspects, the links are chosen by a search engine analyzing the links most frequently clicked in response to a particular query. For example, the search engine may collect "click-through" data indicating which links are clicked on in response to a particular query, and select one or more links to prerender based upon the frequency with which the particular links are selected. To continue the search engine example, the server 104 might identify the top search result, or the top "n" search results as optimal links to prerender. In some aspects, the server 104 may further identify a ranking of links to prerender, with the most optimal link to prerender being ranked number 1, the next most optimal link being ranked number 2, and so on. The server 104 may also identify a likelihood that each link will be selected, rather than a rank. For example, the server 104 may indicate that a particular link has a 50% likelihood, a 25% likelihood, or a 80% likelihood of being selected by a user. Prerender operations performed by the client may elect to prerender links associated with a threshold level of likelihood, for example, such as at least 50% likelihood, at least 80% likelihood, or any other threshold value.

At stage 406, the server 104 embeds one or more prerender tags with the one or more links identified at stage 404. For example, the server 104 may include a hypertext markup language (HTML) tag for identifying the optimal link or links to prerender. As described above, the prerender tag may also include a ranking value and a TTL value specifying a time to keep the prerender. To continue the search engine example, the server 104 may identify each search result with a prerender tag, along with ranking the prerender order of the results by the relevance of the search result.

At stage 408, the page with the embedded prerender tags is sent to the client that requested the page. The method 400 then ends after sending the page.

Figure 5:
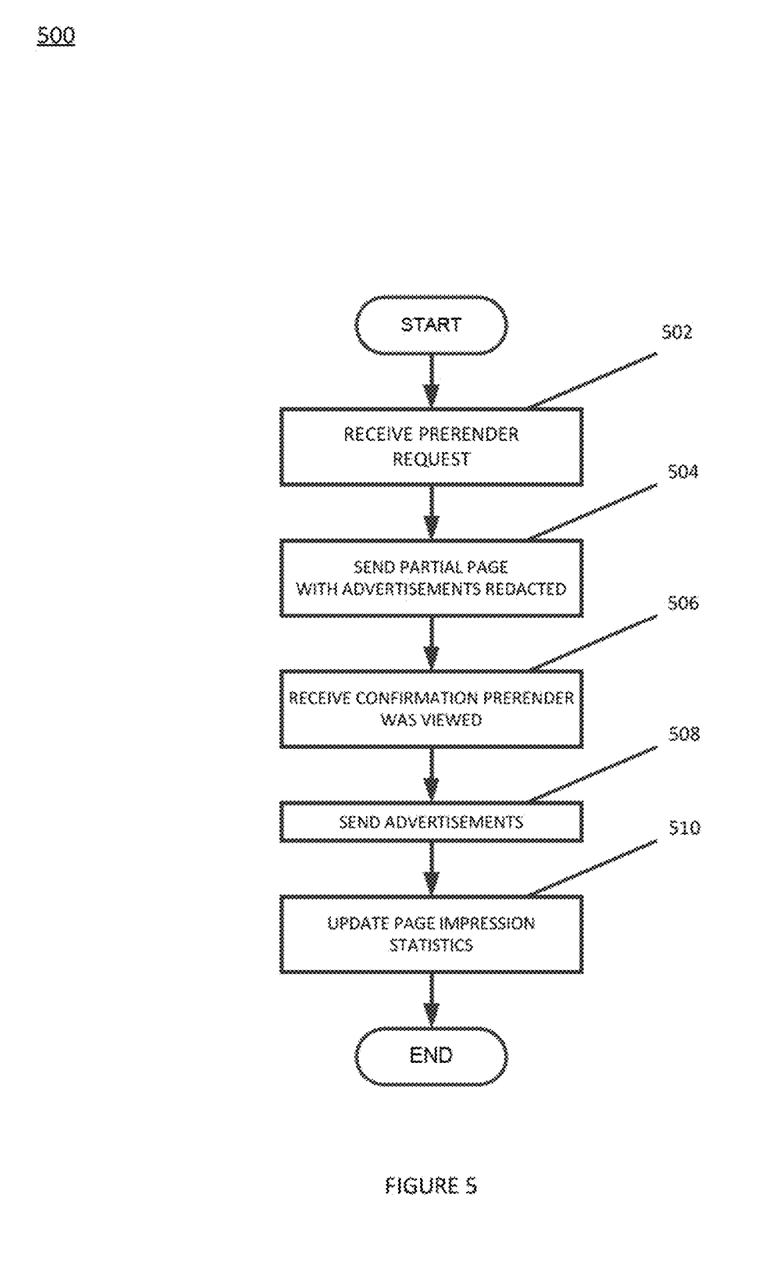
FIG. 5 is a flow diagram depicting an example method for managing web impression statistics during a prerender operation in accordance with aspects of the disclosure.

FIG. 5 is a flow diagram depicting an example method 500 for managing web impression statistics during a prerender operation in accordance with aspects of the disclosure. Web sites often track what content is viewed, which pages are accessed, in what order those pages are accessed, and how much time is spent on each page. These capture and analysis of such data is broadly referred to as "website analytics". These statistics provide data that may be used by site operators for a variety of purposes. For example, one such use of this data is to calculate rates for advertisements displayed along with the content. However, in some instances, the user may not select the navigation event associated with prerendered content, thus possible interfering with collection of this data. For example, the traditional model of tracking user impressions via the number of times a given page is sent to the user may no longer provide accurate results, because the user may not view the content every time it is sent. As such, the server, such as the server 104, may provide a method for accurate tracking of impressions that takes into account prerendered content. One such method is described below. Although specific examples of the method may be provided with respect to managing impression statistics of advertisement content, it should be appreciated that aspects of the method are broadly applicable to ensuring accurate website analytics for pages served in response to prerender requests.

At stage 502, the server 104 receives a prerender request from a computing device, such as the computing device 200. In some aspects, the prerender request may be identified using a scripting application programming interface (API), such as by the computing device 200 indicating the content request is for a prerender operation via a JAVASCRIPT API transmitted with the content request. The prerender request may also be accompanied by a modified HTTP header, indicating that the request is a prerender request. In some aspects, the server 104 is configured to receive an event notification from the computing device 200 as provided by the API, such as by registering for the event notification using an application executing on the server 104. In some aspects, the server 104 may elect to not send content in response to a prerender request, such as in instances where the server is bandwidth constrained, or otherwise does not wish to allow prerendering. Providing notification of the prerender request in this manner also allows for the server 104 to "opt-out" of processing the prerender request. For example, the server 104 may be bandwidth constrained and thus need to focus on hosting non-prerendered content. In some aspects, the server 104 may also opt-out by including a HTML metatag indicating as such, or an entry in a "robots.txt" file hosted on the server to prevent prerendering of content by a search engine, such as indicated in a list of search results.

At stage 504, the server 104 may send a partial web page, with the certain content redacted. For example, the server 104 may not provide images associated with advertisement content in response to a prerender request, as in many instances advertisement impressions are determined based upon the number of times the advertisement image is sent. A similar method may apply to advertisements provided in other manners, such as via scripting or executable content. As an example, the server 104 might respond to a prerender request by providing a base web page. The base web page may result in the computing device 200 initiating one or more additional HTTP GET requests for content identified by the base web page. The server 104 may opt not to send content in response to HTTP GET requests for ad images identified within the base web page.

In some aspects, the redacted version of the content may include a special HTTP error codes associated with redacted images, scripts, and the like, indicating to the receiving computing device that certain content has been redacted. In this manner, the computing device 200 may be informed that certain content has been redacted and will be supplied later, rather than that the content is unavailable. As such, the computing device 200 may opt to indicate redacted content with a particular graphic or temporary display while the content loads upon access, or the redacted content may appear blank.

In some cases, the computing device 200 may not be aware of how to properly display redacted content, in which case the computing device 200 may abort the prerender operation. Furthermore, when the user accesses the content, the computing device 200 may notify the server 104 that the prerendered page has been viewed. In response, the server 104 may send the redacted content to the computing device 200.

At stage 506, the server 104 receives confirmation that the prerender of the content was viewed by the user. As above, the server 104 may be notified of the viewing of the content via an API provided through the web browser. For example, a script may communicate an event notification to the server 104. If the server 104 is registered for such an event notification, it may take appropriate action, such as sending the redacted content to the computing device 200. By informing the server 104 that the prerender content was viewed, the server 104 knows to send any redacted content and update the impression statistics associated with any advertisements.

At stage 508, the server 104 sends the content that was redacted at stage 504. The content can now be sent because the server 104 has ensured that the user has accessed the content. For example, the server 104 may send images associated with advertisements, scripting code, or the like.

At stage 510, the server 104 updates the impression statistics associated with the content as sent at stage 508. In some aspects, stages 508 and 510 occur simultaneously as the act of hosting the image/sending an advertisement automatically updates the page impression statistics. In this manner the server 104 maintains accurate reporting of website analytics data while also allowing the computing device 200 to perform prerender operations.

Figure 6:
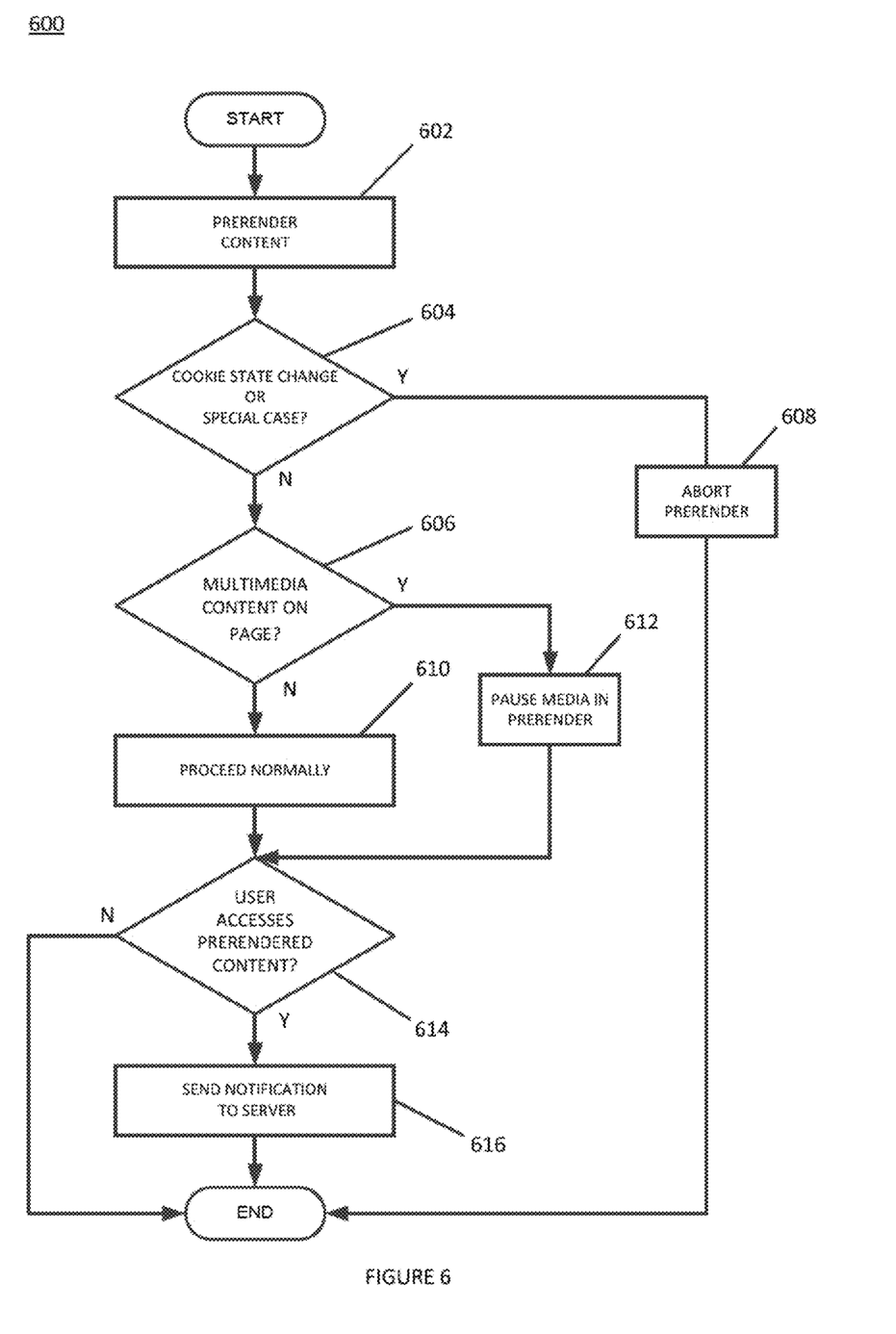
FIG. 6 is a flow diagram depicting an example method for managing a prerender operation in accordance with aspects of the disclosure.

FIG. 6 is a flow diagram depicting an example method 600 for managing a prerender operation in accordance with aspects of the disclosure. In order to provide an optimal prerendering experience, the computing device 200 can account for different factors that may affect the browsing experience. For example, web pages commonly use small files known as cookies to provide various page services via the web browser. For example, a news site may employ a tracking cookie to allow a user to access one news article per day without registering on the page. A prerender operation associated with that news site could then interfere with the user's browsing experience, as the user may prerender an article he does not intend to read, thus using up the one free article per day on a page he has not viewed.

Some web pages have embedded audio or video content that begins to play as soon as the page loads. In some implementations, the prerender method and system as described herein can allow such content to begin playing before the user navigates to the content, thus when the user begins viewing the page, the content is already playing. Some web pages may include additional content that might not be suitable for prerendering, such as pop-up pages, scripted programs, downloads, authentication prompts, translation bars, and the like. As such, the prerender module 210 may employ a method, such as the method 600, for managing these special cases.

At stage 602, the computing device 200 requests and receives prerender content from a server, such as the server 104. As described above, the request may be presented in or accompanied by an API call, indicating to the server that the request is a prerender request. The page is prerendered based on a response received from the server. During the prerendering process, the computing device 200 monitors for several particular cases as described below. Although presented in a particular order, these cases could be encountered in any order, such as by identifying an embedded video prior to experiencing a cookie state change, for example.

At stage 604, the computing device 200 determines whether the requested prerender content includes a cookie state change or another special case. For example, if a user is accessing a banking web page, if an account page is prerendered and then the user logs out of their account, selecting the prerender link would incorrectly report data as if the user was still logged in. As such, the prerender would be invalid as soon as the user has logged out. The computing device 200 therefore monitors the state of any cookies associated with prerender content and may take appropriate action. Appropriate action may include attempting to properly propagate cookie state changes, ignoring cookie state changes and continuing with the prerender operation, or giving up and aborting the prerender operation. The computing device 200 further determines if the prerender content includes a special case, such as a pop-up page, a scripted application, a download, an authentication menu, or a translation bar. If a cookie state change has occurred or the prerender page includes a special case, the method proceeds to stage 608. Otherwise the method 600 continues to stage 606.

At stage 608, the computing device 200 may abort the prerender operation. The computing device 200 may abort the prerender operation because the cookie state change or special case identified at stage 604 makes the data associated with the prerendered page stale or otherwise unviewable to the user. In some aspects, the computing device 200 may ignore the cookie state change. The method 600 then ends.

As an alternate method of managing cookie data, the computing device 200 may track any cookie state change associated with the prerendered content, and apply the state change when the prerendered content is accessed by the user. In some aspects, the computing device 200 may also monitor for conflicts in cookie state change, and abort the prerendering operation in the event of a conflict. For example, a cookie state change may occur after the prerender operation is complete, thus causing a conflict. In such a case, the prerendered version of the page could be discarded to avoid presenting incorrect page data to the user.

At stage 606, if the prerender content does not contain a special case and has not had a cookie state change, the computing device 200 determines whether there is multimedia content on the page, such as audio or video. For example, the page may include an embedded video programmed with ADOBE FLASH, HTML5 media, or another type of embedded media. In such a situation, it may be desirable to pause the multimedia until the user actually navigates to the page, thus saving bandwidth and ensuring the user may view the entire multimedia file. If the page contains embedded multimedia, the method 600 proceeds to stage 612. Otherwise the method 600 proceeds to stage 610.

At stage 610, the computing device 200 has determined that the content contains no multimedia content, cookie state changes, or special cases, and thus the computing device 200 prerenders the page. The prerendering process may be performed by receiving the page from the server 104, and rendering the page in an application instance that is hidden from the user. Rendering the page generally relates to loading all of the data received from the server 104, and executing any instructions contained therein, as they would otherwise be executed when viewing the page in a non-hidden application instance.

At stage 612, the computing device 200 has determined that the content contains multimedia content. Thus the computing device 200 prerenders the content of the page other than the multimedia content, and may pause playback of the multimedia content, or defer the instantiation of a plug-in associated with the content. For example, the computing device 200 might pause an embedded audio or video file after prerendering the rest of the page, or a FLASH video might not execute until the prerender content is shown to the user.

At stage 614, the computing device 200 determines whether the user has accessed the prerendered content. If the user accesses the prerendered content, the content is displayed as described above, and the method 600 proceeds to stage 616. If the user does not access the prerendered content, for example, if a prerender timer expires as described above with respect to FIG. 3, then the method 600 ends.

At stage 616, the computing device 200 sends notification that the user accessed the prerender to the server 104. As described above, the notification may be sent using a scripted API from which the server is configured to receive event notifications. Providing notification in this manner allows for the management of website impressions by the server (see FIG. 5).

Figure 7:
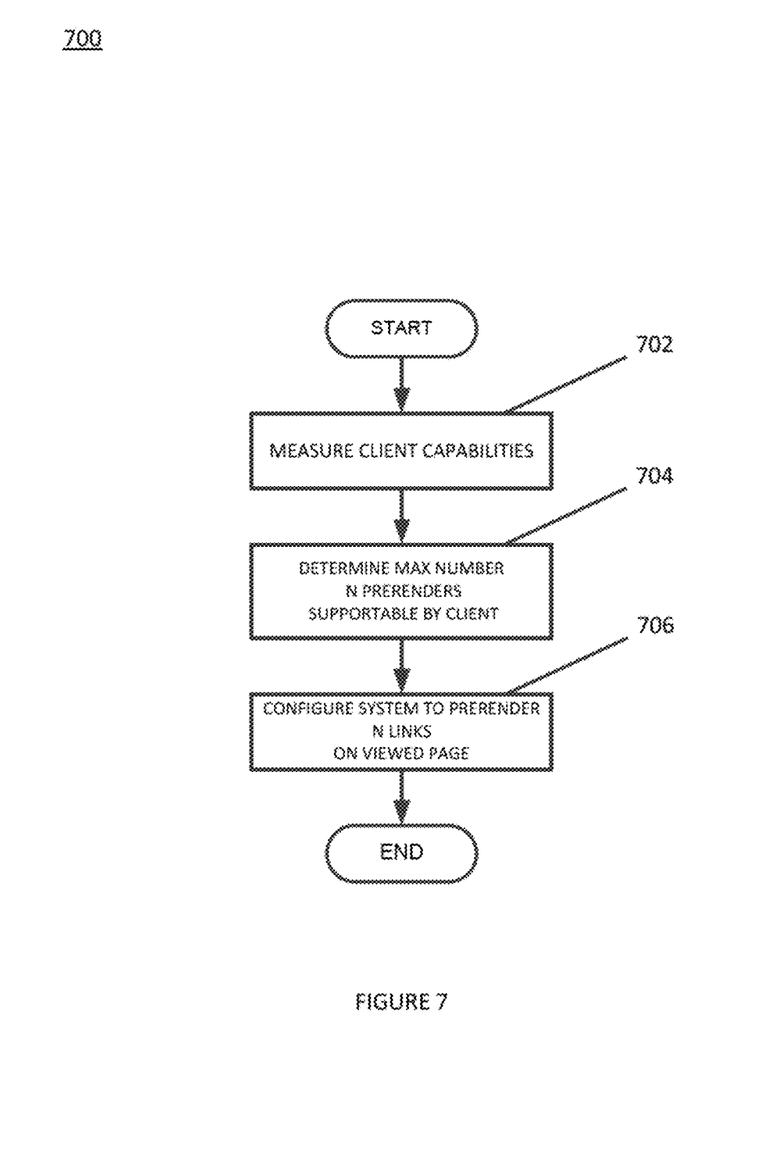
FIG. 7 is a flow diagram depicting an example method for configuring a prerender operation in accordance with aspects of the disclosure.

FIG. 7 is a flow diagram depicting an example method 700 for configuring a prerender operation in accordance with aspects of the disclosure. Different computing devices may possess different capabilities, such as network bandwidth, system memory, and processor speed. As such, various devices may be able to support different prerender operations. A device with more capability may be able to support multiple prerender operations, or the prerendering of more complicated pages. As such, the method 700 provides for configuration of these prerender operations based upon the capabilities of the system.

At stage 702, the computing device 200 conducts a measurement of system capabilities. For example, the computing device 200 may query the operating system for the amount of free system memory, the computing device 200 may request the processor speed from the basic input-output system (BIOS), or the computing device 200 may conduct a network speed test to determine free bandwidth.

At stage 704, the computing device 200 determines a maximum number "n" prerenders based upon the capabilities as determined at stage 702. In some aspects, the computing device 200 may determine a set of system requirements to support a single prerender instance. For example, a single prerender instance may require 10 percent processor utilization, 16 megabytes of system memory, at least 10 kilobytes/second of network bandwidth, or the like. The system requirements may also include multiple capabilities associated with different system components, such as each of a minimum memory requirement, a processor utilization, and a network bandwidth. These system requirements may be determined by measuring the system utilization of a single prerender instance executing on the client device 200.

For example, the computing device 200 may determine that each prerender operation is likely to require the system processor while prerendering. Such processor use may be "bursty" in that the entire processor is needed when the page is first loading, with reduced processor need thereafter. In such cases, the computing device 200 may assign a lower processor priority to the prerender instance to ensure that prerendering of a page does not impact the user's browsing experience. In some aspects, the computing device 200 may monitor a system memory to determine a number of prerender instances. The computing device 200 may determine an amount of memory used by a prerender instance and then compare this amount to the total available memory capacity. In some aspects, the computing device 200 may reserve a particular amount of system memory for prerendering, and generate prerender instances until the reserved memory is filled. In some aspects, a maximum network bandwidth of the system is determined, and prerender instances are generated based on the percentage of available bandwidth. In some aspects, the computing device 200 may request a bandwidth measurement from a remote server to identify a local maximum bandwidth, and use the measurement to determine a prerender setting.

At stage 706, the computing device 200 is configured to perform as many simultaneous prerenders as the system capabilities can support, as determined at stage 704. In some instances, the number of prerenders may be configurable by the user, such as in an options menu.

Figure 8:
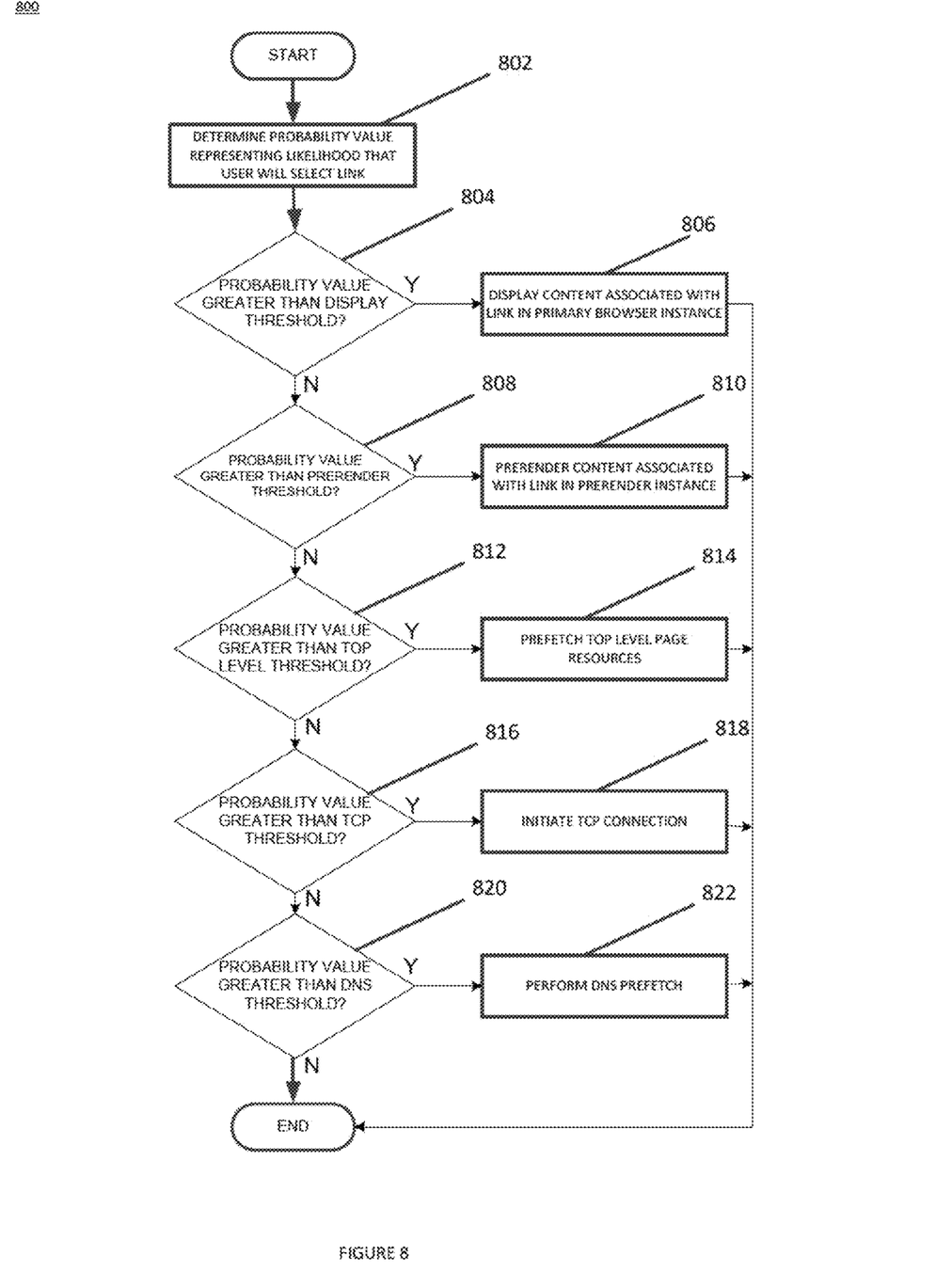
FIG. 8 is a flow diagram depicting an example method for performing a partial prerender based on probability thresholds in accordance with aspects of the disclosure.

FIG. 8 is a flow diagram depicting an example method 800 for performing a partial prerender based on probability thresholds in accordance with aspects of the disclosure. The method 800 performs increasingly aggressive prerendering operations depending upon the probability that a user will select a particular link or other navigation destination. If there is a high probability that the user will navigate to a particular link, then more aggressive actions, such as prerendering the entire page, may be appropriate. If the user is less likely to select the link, then less aggressive operations may be performed, such as DNS prefetching or establishment of a TCP connection. In this manner, aspects of the method advantageously decrease the amount of time waiting for content to load while also minimizing the load placed upon system resources.

A probability value for a given link may be determined in a variety of manners. For example, a user navigation history may indicate how likely a user is to navigate to a particular destination page from a particular source page, or how likely the user is to select a particular result displayed in response to entry within a text entry field, such as the address bar of a web browser. Various other methods of determining a probability value may include receiving probability from a remote server (e.g., a search engine that provides statistical data for how frequently each displayed search result is selected by users), or by analysis of user inputs (e.g., cursor movement).

For example, if, based on user input, it can be determined that the user is extremely likely to wish to navigate to a particular page, then it may be appropriate to automatically request content for the particular page and present the requested content to the user. Lesser thresholds may result in the content for the particular page being prerendered in a hidden instance, top level resource content of the particular page being prefetched, establishment of a TCP connection to the particular page, or prefetching of DNS information associated with the particular page.

At stage 802, a probability value or values for one or more links on a web page is determined. In some aspects, the method 800 may be executed by the prerender module 210 based upon probability values received from the navigation prediction module 208. The navigation prediction module 208 may determine probability values for one or more links on a page, and report those probability values to the prerender module 210 so that the prerender module 210 may take appropriate action. The navigation prediction module 208 may determine the probability values in a variety of ways, including but not limited to monitoring mouse cursor movement, monitoring user text input, analysis of user navigation histories, receiving probability data from a remote server, and the like.

The probability values are compared to a series of threshold values to determine the proper operation. A higher threshold value is typically associated with a more aggressive prerender operation. More aggressive prerender operations typically consume more system resources, such as processor utilization, memory, network bandwidth, and the like.

At stage 804, the received probability value is compared to a page display threshold. The page display threshold corresponds to a probability above which the identified page will be immediately requested and displayed. Such a display threshold may correspond to an extremely high probability, such as a 95%, 99%, or 99.9% likelihood that the user will select the link associated with the page. The page is thus displayed to the user at stage 806 if the probability value is greater than the display threshold.

If the probability value is not greater than the display threshold, at stage 808, the received probability value is compared to a prerender threshold. The prerender threshold corresponds to a probability above which the identified page will be requested and prerendered in a hidden browser instance. The page will then be swapped into the active browser instance if the user selects the link associated with the page. As prerendering a web page is less aggressive than actually displaying the page in the active browser instance, such an action may be associated with a lower probability. For example, the prerender threshold may be set at a probability value of greater than an 80%, 85%, or 90% likelihood that the user will visit a particular link. The page is prerendered at stage 810 if probability value is greater than the prerender threshold.

If the probability value is not greater than the prerender threshold, at stage 812, the received probability value is compared to a top level threshold. The top level threshold corresponds to a probability above which the identified page will have its top level resource requested by the web browser, but not any second-level content such as images or other media. The prefetching of a top level resource requires less bandwidth and system resources than prerendering the entire page, so a lower threshold than the prerender threshold is appropriate. As such, the top level resource may be prefetched at a probability value greater than 60%, 70%, or 75%. The top level resource is prefetched at stage 814 if the probability value is greater than the top level threshold.

If the probability value is not greater than the top level threshold, at stage 816, the received probability value is compared to a TCP threshold. The TCP threshold corresponds to a probability above which the web browser will establish a TCP connection with the server hosting the identified page. As with the previous steps, establishing a TCP connection in this manner is less resource-intensive than prefetching the top level resource. As such, the TCP connection threshold may be established at a probability value representing a greater than 40%, 50%, or 55% likelihood that the user will select the link. The TCP connection is established at stage 818 if the probability value is greater than the TCP threshold.

If the probability value is not greater than the TCP threshold, at stage 820, the received probability value is compared to a DNS prefetch threshold. The DNS threshold corresponds to a probability above which the web browser will perform a DNS lookup on the identified page. The DNS lookup operation is a preliminary and minimally invasive part of the process by which content is requested from a web page. As such, the DNS lookup operation requires a minimum of system resources. It is thus appropriate to perform this operation at a probability even lower than that for the TCP connection, such as 5%, 10%, or 30%. The DNS lookup operation is performed at step 822 if the probability value is greater than the DNS threshold.

If the probability value is less than each of the thresholds, then no operation is performed and the method ends.

Although the method 800 is described with respect to a single probability value and 5 specific thresholds for performing 5 operations, the method could also be performed to access network content associated with a plurality of web pages and various other network connection operations not specifically described above. More or fewer thresholds may be prescribed, with analysis performed in a different order (e.g., begin the connection with minimally aggressive operations and continue until the probability compared to a threshold indicates prerendering should be stopped). Accessing network content in this way advantageously minimizes the consumption of system resources and/or network bandwidth, while maximizing the speed with which the users may access network content.

The stages of the illustrated methods are not intended to be limiting. The functionality of the methods can exist in a fewer or greater number of stages than what is shown and, even with the depicted methods, the particular order of events may be different from what is shown in the figures.

The systems and methods described herein advantageously provide for an improved browsing experience. By prerendering the next navigation event, the system and methods minimize the amount of time users wait for network content to load. The various management and configuration methods provide for a robust experience that ensures accurate impression counts for advertisers hosting content.

As these and other variations and combinations of the features discussed above can be utilized without departing from the disclosure as defined by the claims, the foregoing description of the embodiments should be taken by way of illustration rather than by way of limitation of the disclosure as defined by the claims. It will also be understood that the provision of examples of the disclosure (as well as clauses phrased as "such as," "e.g.", "including" and the like) should not be interpreted as limiting the disclosure to the specific examples; rather, the examples are intended to illustrate only some of many possible embodiments.

The invention claimed is:

1. A computer-implemented method for accessing network content, the method comprising:
   determining a probability value, using a processor, for each of one or more links associated with web content, the probability value indicating a likelihood that a user will select the associated link;
   determining whether the probability value satisfies at least one action threshold in a series of action thresholds, each action threshold in the series being associated with an increasingly aggressive network content access action; and
   performing the network content access action associated with each action threshold in the series of action thresholds based on a highest action threshold that the probability value satisfies so as to reduce a delay in accessing network content upon selection of the associated link, wherein performing comprises:
      determining an amount of resources needed to perform the network content access action;
      comparing the amount of resources needed to perform the network content access action to an amount of available resources; and
      assigning a priority for performing the network content access action based on the comparison and the probability value associated with the network content access action associated with a highest action threshold that the probability value satisfies.

2. The method of claim 1, further comprising determining the probability value by at least one of analyzing a navigation history, analyzing a text entry, and analyzing a mouse cursor movement.

3. The method of claim 1, wherein the network content access action comprises at least one of displaying the network content in a primary browser window, prerendering the network content in a hidden browser instance, prefetching a top-level resource, initiating a transmission control protocol connection, and retrieving domain name services information.

4. The method of claim 1, further comprising:
   repeating determining the probability value, determining whether the probability value exceeds the one or more action thresholds, and performing the network content access action for each of a plurality of links present on a web page.

5. The method of claim 1, further comprising:
   ordering the one or more action thresholds in increasing order of required probability value, such that network content access actions requiring a higher threshold probability value are performed after network content access actions requiring a lower threshold probability value.

6. The method of claim 1, wherein the probability value is received from a web service.

7. A non-transitory computer readable storage medium containing instructions that, when executed by a processor cause the processor to perform a method comprising:
   determining a probability value, using a processor, for each of one or more links associated with web content, the probability value indicating a likelihood that a user will select the associated link;
   determining whether the probability value satisfies at least one action threshold in a series of action thresholds, each action threshold in the series being associated with an increasingly aggressive network content access action; and
   performing the network content access action associated with each action threshold in the series of action thresholds based on a highest action threshold that the probability value satisfies so as to reduce a delay in accessing network content upon selection of the associated link, wherein performing comprises:
      determining an amount of resources needed to perform the network content access action;
      comparing the amount of resources needed to perform the network content access action to an amount of available resources; and
      assigning a priority for performing the network content access action based on the comparison and the probability value associated with the network content access action associated with a highest action threshold that the probability value satisfies.

8. The non-transitory computer-readable storage medium of claim 7, further comprising determining the probability value by at least one of analyzing a navigation history, analyzing a text entry, and analyzing a mouse cursor movement.

9. The non-transitory computer-readable storage medium of claim 7, wherein the network content access action comprises at least one of displaying the network content in a primary browser window, prerendering the network content in a hidden browser instance, prefetching a top-level resource, initiating a transmission control protocol connection, and retrieving domain name services information.

10. The non-transitory computer-readable storage medium of claim 7, further comprising:
    repeating determining a probability value, determining whether the probability value exceeds the one or more action thresholds, and performing the network content access action for each of a plurality of links present on a web page.

11. The non-transitory computer-readable storage medium of claim 7, further comprising:
    ordering the one or more action thresholds in increasing order of required probability value, such that network content access actions requiring a higher threshold probability value are performed after network content access actions requiring a lower threshold probability value.

12. The non-transitory computer-readable storage medium of claim 7, wherein the probability value is received from a web service.

13. A processing system for accessing network content, the processing system comprising:
at least one processor; and
a memory, coupled to the processor, for storing one or more probability values;
wherein the processor is configured to:
determine a probability value for each of one or more links associated with web content, the probability value indicating a likelihood that a user will select the associated link;
determine whether the probability value satisfies at least one action threshold in a series of action thresholds, each action threshold in the series being associated with an increasingly aggressive network content access action; and
perform the network content access action associated with each action threshold in the series of action thresholds based on a highest action threshold that the probability value satisfies so as to reduce a delay in accessing network content upon selection of the associated link, wherein to perform the processor is further configured to:
determine an amount of resources needed to perform the network content access action;
compare the amount of resources needed to perform the network content access action to an amount of available resources; and
assign a priority for performing the network content access action based on the comparison and the probability value associated with the network content access action associated with a highest action threshold that the probability value satisfies.

14. The processing system of claim 13, wherein the processor is further configured to determine the probability value by at least one of analyzing a navigation history, analyzing a text entry, and analyzing a mouse cursor movement.

15. The processing system of claim 13, wherein the network content access action comprises at least one of displaying the network content in a primary browser window, prerendering the network content in a hidden browser instance, prefetching a top-level resource, initiating a transmission control protocol connection, and retrieving domain name services information.

16. The processing system of claim 13, wherein the processor is further configured to repeat determining a probability value, determining whether the probability value exceeds the one or more action thresholds, and performing the network content access action for each of a plurality of links present on a web page.

17. The processing system of claim 13, wherein the processor is further configured to order the one or more action thresholds in increasing order of required probability value, such that network content access actions requiring a higher threshold probability value are performed after network content access actions requiring a lower threshold probability value.

18. The processing system of claim 13, wherein the probability value is received from a web service.

19. The method of claim 1, further comprising:
determining whether the one or more links are selected within a given time period; and
when the given time period has passed, discarding the non-selected links.

* * * * *